(12) United States Patent
Takizawa

(10) Patent No.: US 6,203,159 B1
(45) Date of Patent: Mar. 20, 2001

(54) PROJECTOR

(75) Inventor: Takeshi Takizawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/343,545

(22) Filed: Jun. 30, 1999

(30) Foreign Application Priority Data

Jun. 30, 1998 (JP) ................................................. 10-185463

(51) Int. Cl.$^7$ .................................................. G03B 21/16
(52) U.S. Cl. .............................................................. 353/61
(58) Field of Search ................................. 353/61, 60, 58, 353/57, 119

(56) References Cited

U.S. PATENT DOCUMENTS 5,418,586 * 5/1995 Fujimori et al. ..................... 353/58
6,007,205 * 12/1999 Fujimori ................................ 353/57

* cited by examiner

*Primary Examiner*—William Dowling
(74) *Attorney, Agent, or Firm*—Oliff & Berridge PLC.

(57) ABSTRACT

A projection display device is provided that enables well-balanced cooling of a light modulator. A projection display device includes a head body having a surface for mounting a light modulator such as a liquid crystal light valve or the like thereon, and an air inlet for cooling the light modulator provided on the surface, the air inlet is formed to be enlarged on a side opposite to the spiral direction of cooling air sucked by an intake fan arranged below the air inlet and blown out. Therefore, the cooling air sucked by the intake fan is blown from an enlarged portion to cool the light modulator with a good balance.

11 Claims, 11 Drawing Sheets

PROJECTOR

BACKGROUND OF THE INVENTION

1. Field of Invention

The present invention relates to a projection display device, and particularly to a technique for miniaturizing a display device and cooling a modulator provided in the device with a good balance.

2. Description of Related Art

A conventional known projection display device comprises a light source lamp, an optical system for optically processing a light beam emitted from the light source to form an optical image corresponding to image information, a projection lens for enlarging and projecting the image formed by the optical system on a projection screen, and a power source for supplying power for driving the device. In such a projection display device, a modulator is generally arranged on a predetermined mounting surface.

Also, the projection display device is widely used for multimedia presentations in a conference, a society meeting, a trade show, and the like. A projection display device is maintained in a state where it is installed in a meeting room for presentations, and if required, it is sometimes carried in or transferred to another place after presentation, and stored therein. Therefore, it is necessary to improve portability in order to facilitate carrying, and thus further miniaturization is required.

In order to miniaturize the device, various components are closely arranged in the device, causing difficulties in a flow of cooling air sucked by a fan or the like. Therefore, means for effectively cooling the components, which generate heat, are provided. Particularly, since a modulator is easily heated, in order to cool the modulator, a cooling air intake is provided below the modulator, and an intake fan is arranged below the modulator to suck cooling air to force the modulator to be cooled.

However, the cooling air sent to the modulator by the intake fan is passed through the cooling air intake provided in the mounting surface from the outlet of the rotating intake fan, and is spirally blown, thereby causing the problem of producing nonuniformity in cooling of the modulator.

SUMMARY OF THE INVENTION

The present invention provides a projection display device permitting well-balanced cooling of a light modulator.

A projection display device of the present invention includes a light source; a light modulator for modulating light emitted from the light source; a projection optical system for projecting the light modulated by the light modulator; a mounting surface for mounting the light modulator thereon; a fan that supplies cooling air to the light modulator, the fan disposed on a side of the mounting surface opposite to a side on which the light modulator is mounted; and an air inlet that introduces cooling air to the light modulator at a position adjacent the mounting surface where the light modulator is mounted; the air inlet being comprised of first and second regions, the first region being opposite to the spiral direction of the cooling air supplied to the light modulator from the fan, the first region and the second region being on opposite sides of a line of intersection of the air inlet and a surface crossing the light modulator and the mounting surface at right angles, and including the center of the light modulator, the first region being wider than the second region.

In the present invention, the air inlet is enlarged to the side opposite to the air spiral, and the cooling air is blown from the enlarged portion, thereby achieving well-balanced cooling of the light modulator. This leads to the achievement of the object of the present invention.

A projection display device of the present invention also includes a plurality of light modulators for respectively modulating lights of a plurality of colors; a color synthesis optical system for synthesizing the light modulated by the light modulators; a projection optical system for projecting the light synthesized by the color synthesis optical system; the light modulators and the color synthesis optical system being mounted on a mounting surface; a fan that supplies cooling air to the light modulators, the fan being disposed on a side of the mounting surface opposite to a side where the light modulators and the color synthesis optical system are mounted, the cooling air being supplied by the fan in a spiral direction; and air inlets that introduce cooling air to each of the light modulators at a position adjacent the mounting surface where each of the light modulators is mounted; the air inlets being comprised of first and second regions, the first region being formed opposite to the spiral direction of the cooling air supplied to the light modulators from the fan, the first region being wider than the second region.

In the present invention, each of the air inlets is enlarged to the side opposite to the air spiral, and the cooling air is blown from the enlarged portions, thereby achieving well-balanced cooling of the light modulators and the color synthesis optical system.

The color synthesis optical system comprises a prism having a color synthesis film, and a plurality of the light modulators are preferably arranged opposite to the light incident surfaces of the prism.

In the present invention, the prism is also cooled by the cooling air from the air inlets with a good balance.

Also, a straightening vane is preferably provided in the air inlet, for arranging the flow of the cooling air.

In the present invention, the cooling air sucked by the intake fan is efficiently sent to the straightening vane, thereby efficiently cooling the light modulators and the color synthesis optical system with a good balance.

The straightening vane is preferably provided at a position of the line of intersection in the air inlet.

In the present invention, since the mounting position of the straightening vane is determined, the straightening vane can be mounted at a correct position.

The mounting surface is provided with a recessed portion for arranging the fan, and the straightening vane has substantially the same depth as the recessed portion.

In the present invention, the straightening vane does not interfere with mounting of the light modulators and the like.

In the present invention, the mounting surface and a head body having a vertical surface substantially perpendicular to the mounting surface are provided, and a plurality of columnar projections are provided on the vertical surface so that a projection lens which constitutes the projection optical system is preferably fixed on the basis of the ends surfaces of the projections.

In the present invention, in order to precisely position the projection lens, positioning may be performed by shaving the end surfaces of the projections without shaving the entire surface of the vertical surface, thereby decreasing the required labor.

DETAILED DESCRIPTION OF PREFERRED EMBODIMENTS

The present invention will be described below on the basis of the drawings.

(1) Entire construction of device

Figure 1:
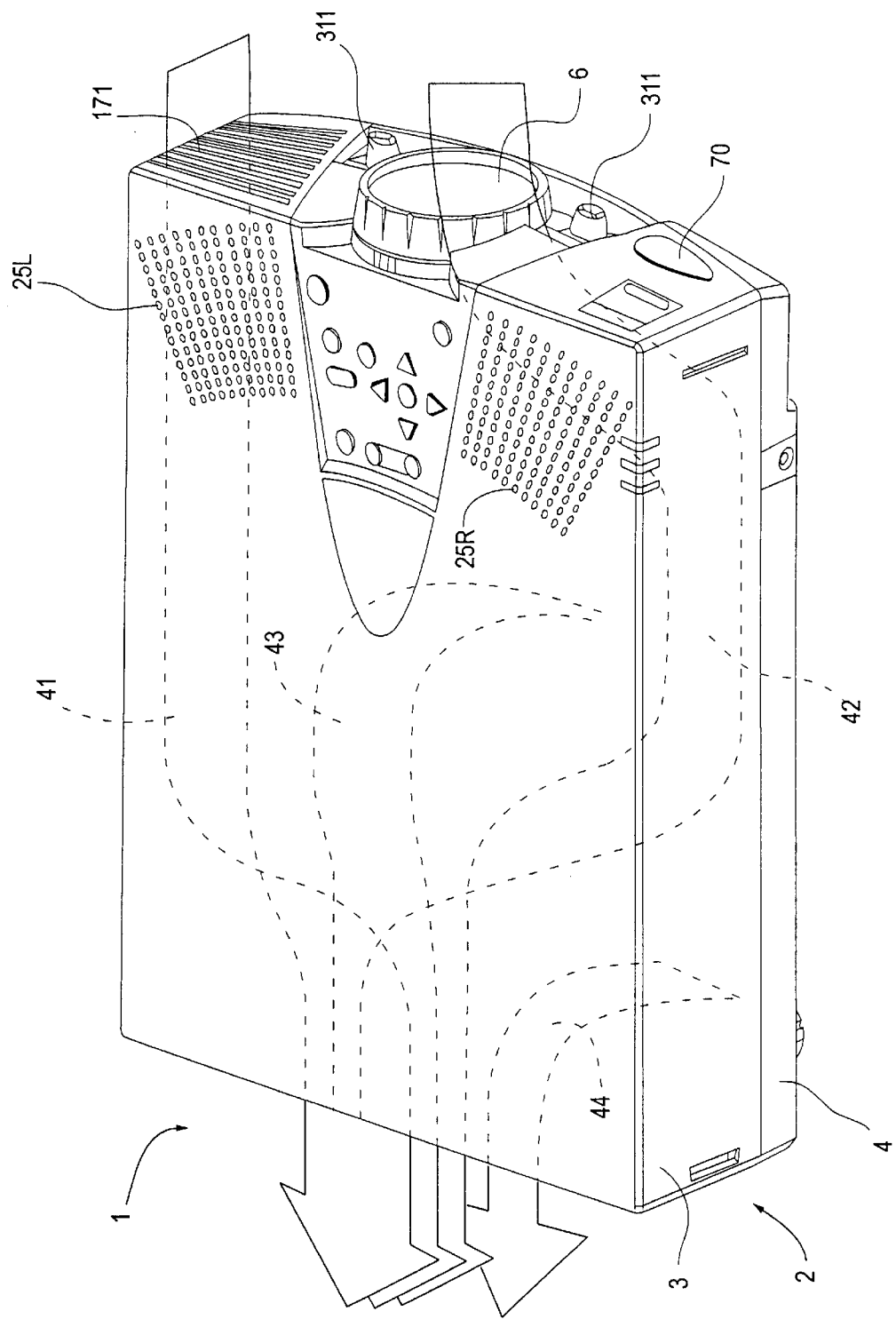
FIG. 1 is a perspective view of a projection display device in accordance with an embodiment of the present invention as viewed from an upper portion.
Figure 2:
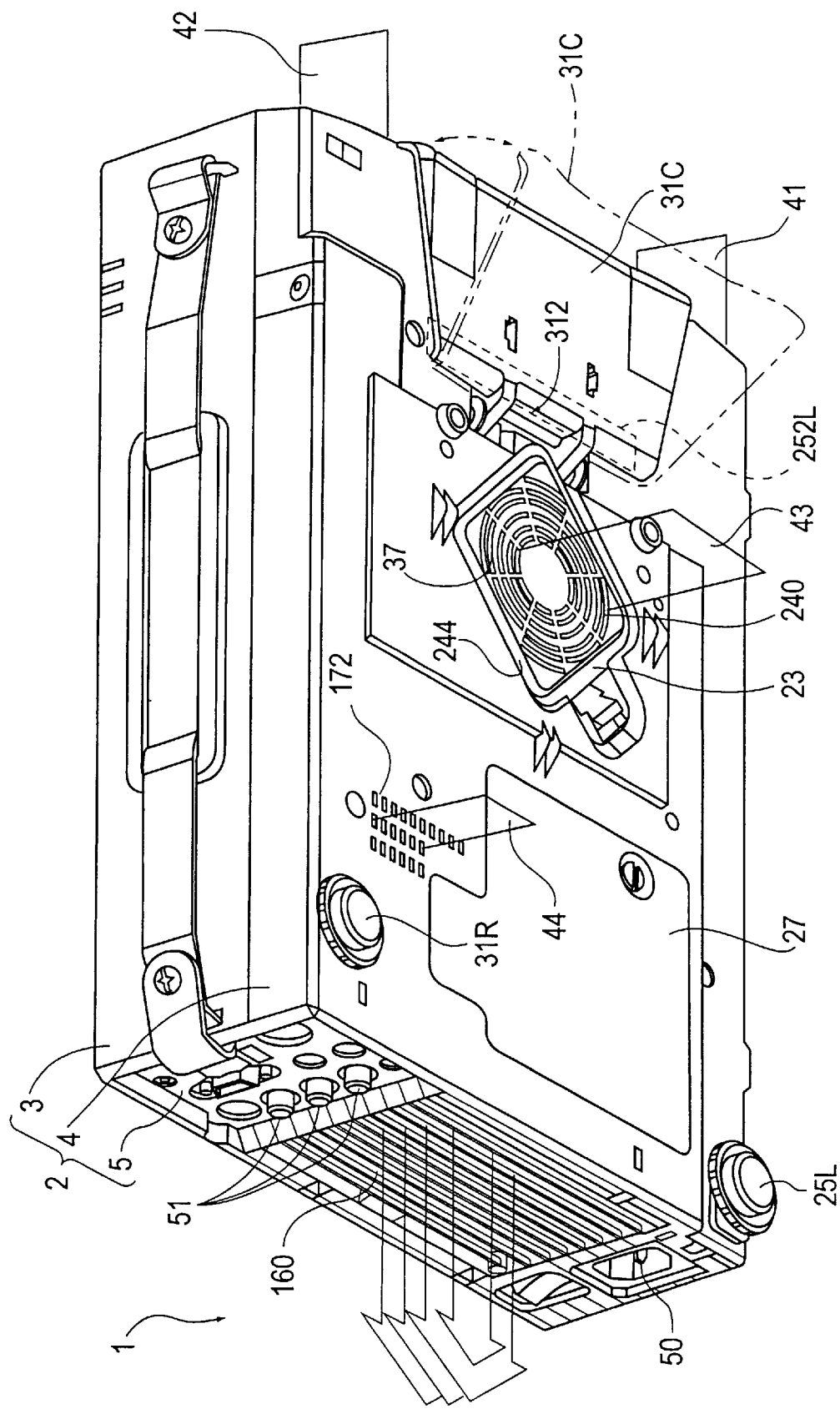
FIG. 2 is a perspective view of the projection display device in accordance with an embodiment of the present invention as viewed from a lower portion.

FIGS. 1 and 2 are schematic perspective views of a projection display device 1 in accordance with an embodiment of the present invention, in which FIG. 1 is a perspective view as viewed from the upper side, and FIG. 2 is a perspective view as viewed from the lower side.

The projection display device 1 is a system in which a light flux (beam) emitted from a light source lamp is separated into the primary colors, red (R), green (G) and blue (B), and each of the color light fluxes is modulated by passing through a liquid crystal light valve (modulator), the modulation corresponding to image information supplied to the modulator, and the modulated light fluxes of these colors are synthesized by a prism (color synthesis optical system), and enlarged and displayed on a projection screen through a projection lens 6. The respective components are contained in an outer case 2 except a portion of the projection lens 6.

(2) Structure of outer case

The outer case 2 basically comprises an upper case 3 for covering the upper side of the device, a lower case 4 which constitutes the bottom of the device, and a rear case 5 (FIG. 2) for covering the rear side.

As shown in FIG. 1, many through holes 25R and 25L are formed on the left and right sides of the upper surface of the upper case 3 at the front end thereof. Also control switches 60 are provided between these through holes 25R and 25L for controlling image quality and the like of the projection display device 1. Furthermore, a light receiving portion 70 is provided on the lower left of the front side of the upper case 3, for receiving light signals from a remote controller not shown in the drawing.

As shown in FIG. 2, a lamp exchange cover 27 for exchanging a light source lamp unit 8 (described below) contained in the device, and an air filter cover 23 having an air inlet 240 formed for cooling the inside of the device are provided at the bottom of the lower case 4.

Also, a foot 31C is provided at substantially the center of the front end of the bottom of the lower case 4, and foot 31R and foot 31L are provided at the right and left corners of the rear end, as shown in FIG. 2. When a lever 311 shown in FIG. 1 is moved upward, the foot 31C is rotated by a rotational mechanism 312 (FIG. 2) provided on the rear side of the foot 31C to be urged to an open state where the front side of the foot 31C is separated from the body of the device, as shown by a two-dot chain line in FIG. 2. The vertical position of the display screen on the projection surface can be changed by adjusting the amount of rotation of the foot 31C. On the other hand, the foot 31R and 31L are rotated to be moved forward and backward in the direction of projection so that the inclination of the display screen can be changed by adjusting the amount of forward and backward movement.

As shown in FIG. 2, an AC inlet 50 for supplying external electric power, and a group 51 of various input/output terminals are arranged on the rear case 5, and an exhaust port 160 is formed adjacent to the input/output terminal group 51, for exhausting air from the inside of the device.

(3) Internal structure of the device

Figure 3:
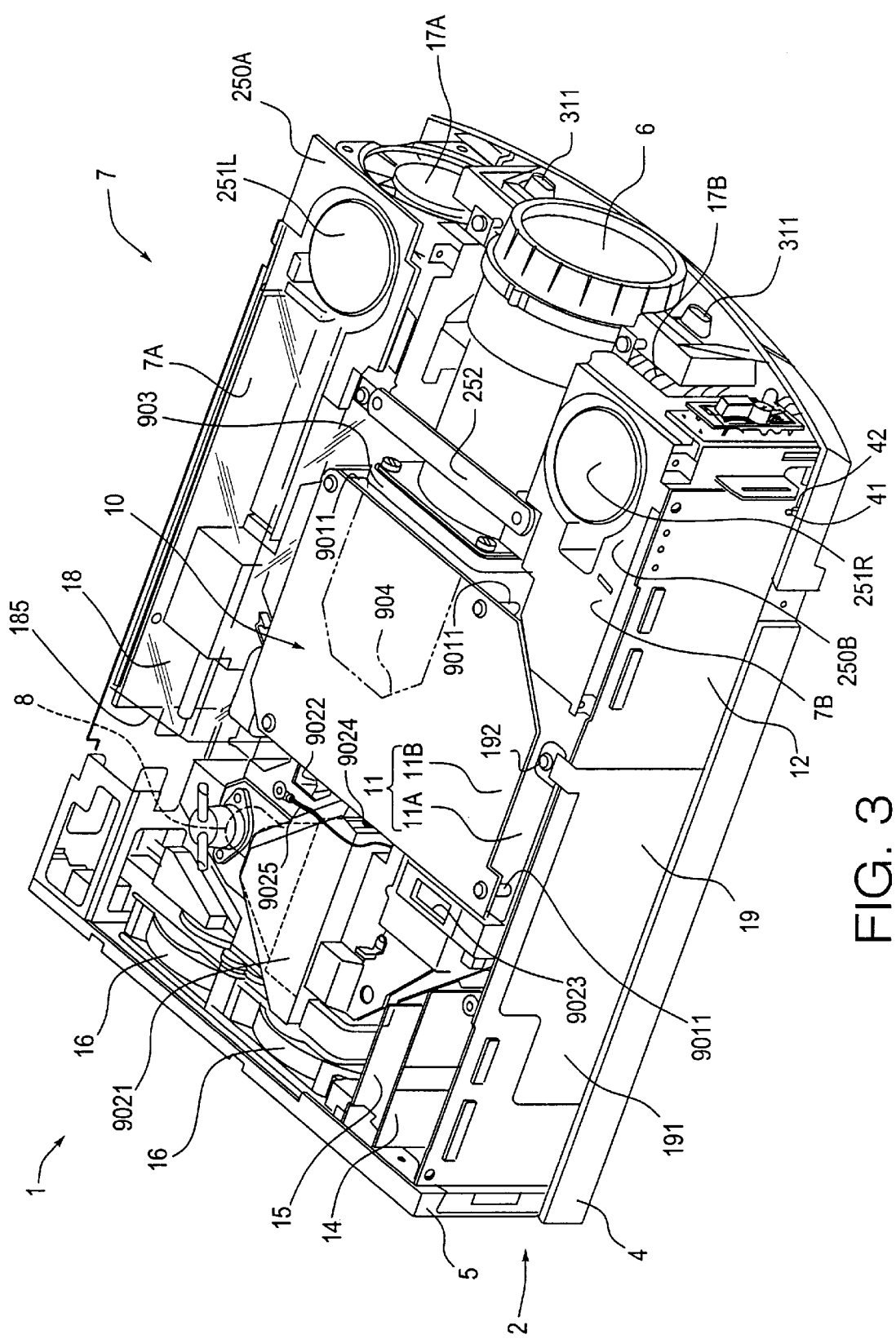
FIG. 3 is a perspective view showing the internal structure of the projection display device in accordance with an embodiment of the present invention.
Figure 4:
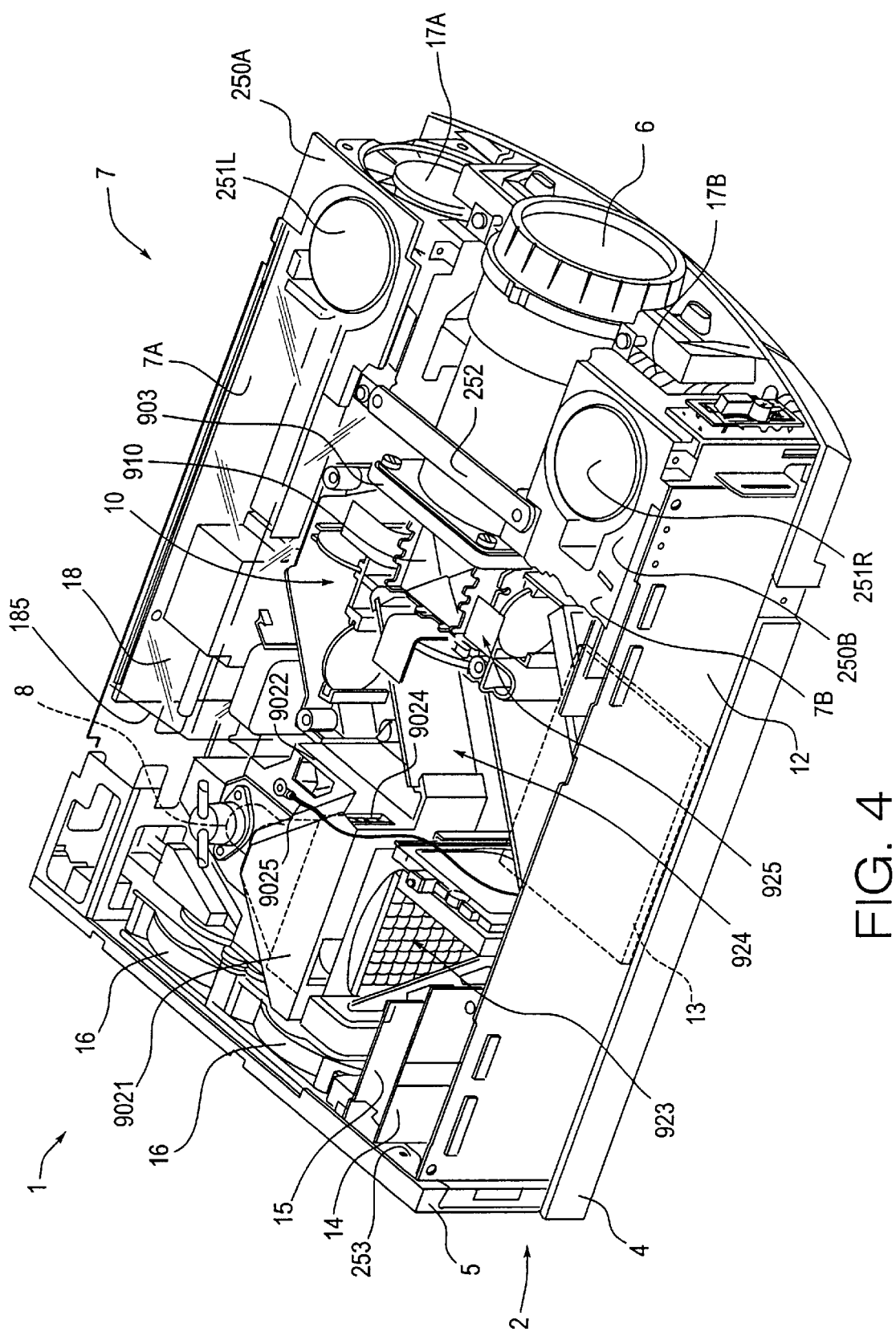
FIG. 4 is a perspective view showing an optical system in the projection display device in accordance with an embodiment of the present invention.
Figure 5:
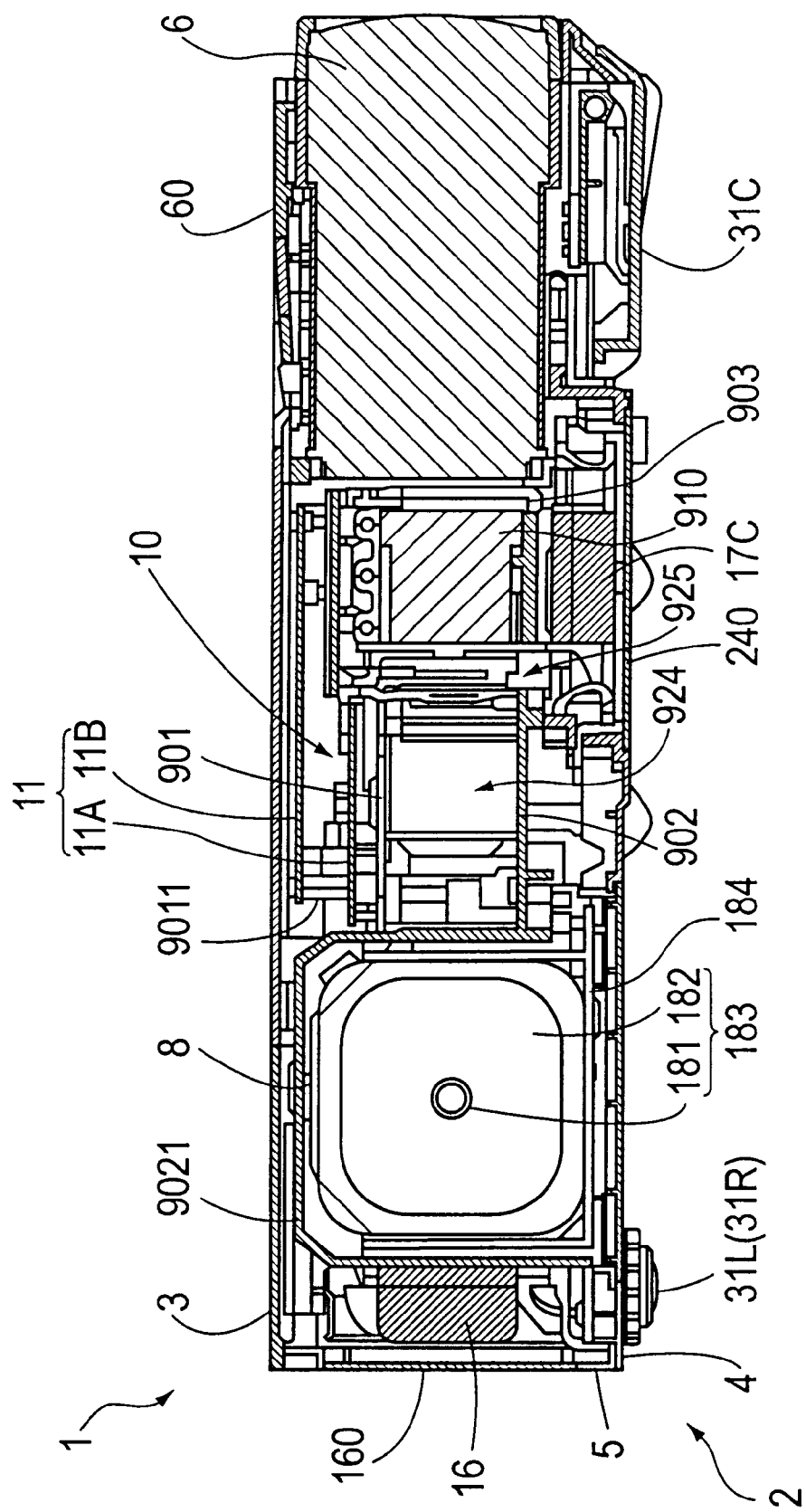
FIG. 5 is a vertical sectional view showing the internal structure of the projection display device in accordance with an embodiment of the present invention.

FIGS. 3 to 5 show the internal structure of the projection display device 1. FIGS. 3 and 4 are schematic perspective views of the inside of the device, and FIG. 5 is a vertical sectional view of the projection display device 1.

As shown in these drawings, a power unit 7 as a power source, the light source lamp unit 8, an optical unit 10 which constitutes an optical system, a pair of upper and lower driver boards 11 serving as modulation element driving substrates, and a main board 12 serving as a control circuit substrate and the like are arranged in the outer case 2.

The power unit 7 comprises first and second power blocks 7A and 7B arranged on both sides of the projection lens 6. The first power block 7A transforms the voltage of electric power obtained through the AC inlet 50 to mainly supply it to the second power block 7B and the light source lamp unit 8. The first power block 7A comprises a power circuit substrate on which a transformer, a rectifier circuit, a smoothing circuit, a voltage stabilizing circuit, and the like are formed, and a lamp driving substrate 18 for driving the light source lamp 8 of the light source lamp unit 8, which will be described below, the lamp driving substrate 18 being covered with a transparent resin cover 185. The second power block 7B further transforms the voltage of the electric power obtained from the first power block 7A and supplies the electric power. Like the first power block 7A, the second power block 7B comprises a power circuit substrate on which a transformer, and various circuits are formed. The electric power is supplied to another power circuit substrate 13 (shown by a dotted line in FIG. 4) arranged below the optical unit 10, and first and second intake fans 17A and 17B arranged adjacent to the power blocks 7A and 7B, respectively. On the basis of the electric power supplied from the second power block 7B, a power circuit on the power circuit substrate 13 mainly generates electric power for driving a control circuit on the main board 12, as well as electric power for other low-power components. The second intake fan 17B is arranged between the second power block 7B and the projection lens 6 so as to draw the cooling air from the outside through the space formed between the projection lens 6 and the upper case 3 (FIG. 1) toward the inside of the device. The power blocks 7A and 7B respectively comprise cover members 250A and 250B made of aluminum or the like having conductivity, the cover members 250A and 250B comprising speech output speakers 251L and 251R, respectively, provided at positions corresponding to the through holes 25R and 25L of the upper case 3. As shown in FIG. 3, the upper portions of the cover members 250A and 250B are mechanically and electrically connected to each other by a metallic plate 252 having conductivity, and the lower portions are electrically connected by a metallic plate 252L (shown by a dotted line in FIG. 2). The cover members 250A and 250B are finally grounded through a GND (ground) line of the AC inlet 50. The metallic plate 252L of these metallic plates 252 and 252L is previously fixed to the lower case 4 made of a resin, and both ends of the metallic plate 252L are brought into contact with the lower sides of the cover members 250A and 250B by assembling the power blocks 7A and 7B and the lower case 4 to achieve conduction therebetween.

The light source lamp unit 8 constitutes a light source portion of the projection display device 1, and comprises a light source device 183 comprising a light source lamp 181 and a reflector 182, and a lamp housing 184 for containing the light source device 183. The light source lamp unit 8 is covered with a housing portion 9021 formed integrally with a lower light guide 902 (FIG. 5), and can be removed by opening the above-described lamp exchange cover 27. A pair of exhaust fans 16 are provided side by side in a line at positions corresponding to the exhaust port 160 of the rear case 5 behind the housing portion 9021. Although described in detail below, the exhaust fans 16 introduce the cooling air drawn by first to third intake fans 17A to 17C from an opening provide near the housing portion 9021 to the inside thereof to cool the light source lamp unit 8 with the cooling air, and then exhausts the cooling air through the exhaust port 160. The electric power of the respective exhaust fans 16 is supplied from the power circuit substrate 13.

Figure 11:
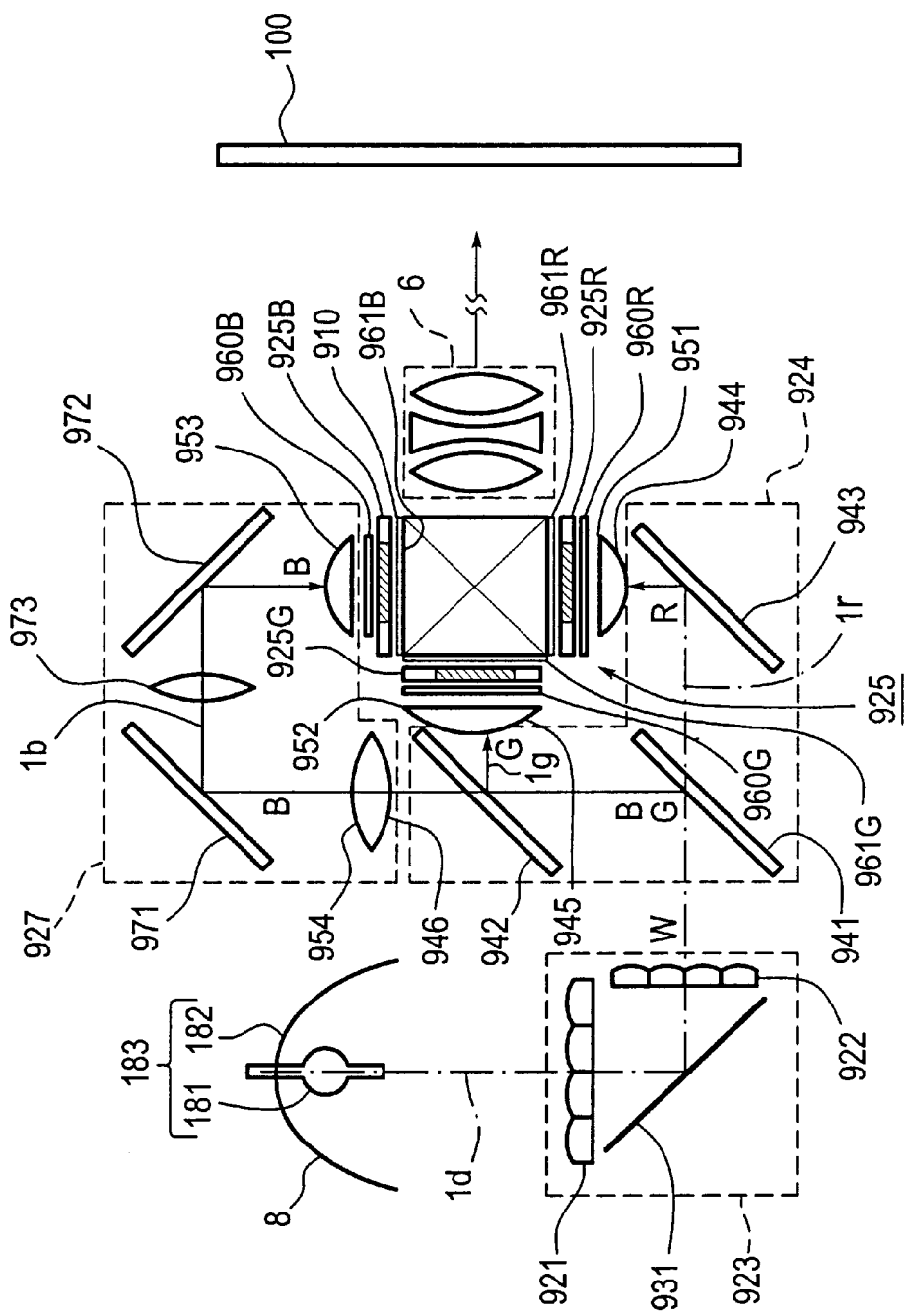
FIG. 11 is a schematic view illustrating the structure of an optical system of the projection display device in accordance with an embodiment of the present invention.

The optical unit 10, as shown in FIG. 11, is a unit for optically processing a light flux emitted from the light source unit 8 to form an optical image corresponding to image information, and comprises an illumination optical system 923, a color separation optical system 924, a modulator 925, and a prism unit 910 as a color synthesis optical system. The optical elements of the optical unit 10 except the modulator 925 and the prism unit 910 are held between upper and lower light guides 901 and 902. The upper and lower light guides 901 and 902 are integrated and fixed to the lower case 4 side by fixing screws.

Figure 6:
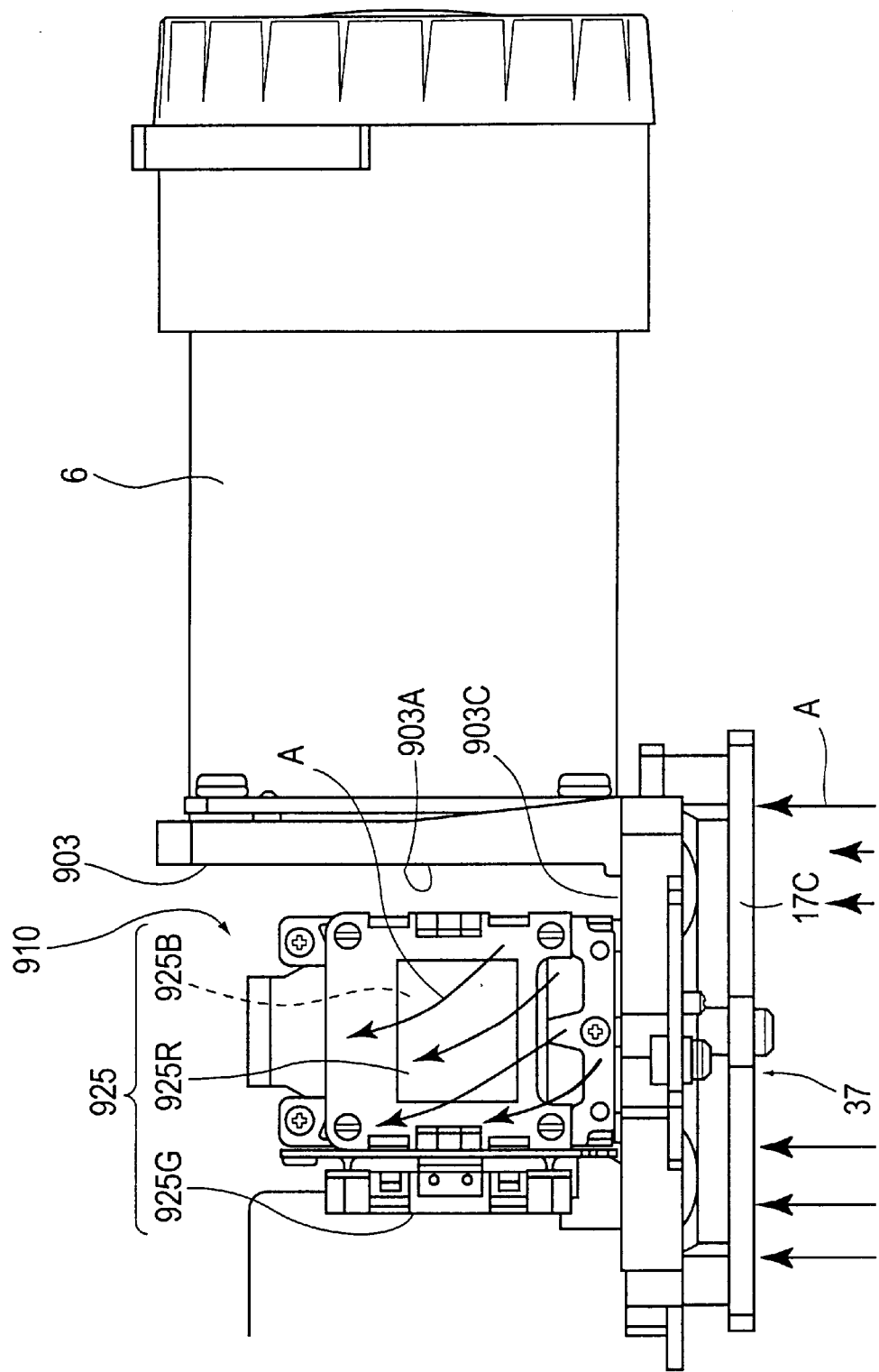
FIG. 6 is a vertical sectional view showing a structure comprising a modulator, a color synthesis optical system and a projection lens in accordance with an embodiment of the present invention.

As shown in FIG. 6, the rectangular prism unit 910 is fixed, by fixing screws, to a prism mounting surface of a head body 903 formed to a structure having a substantially L-shaped side by integrally molding magnesium. Liquid crystal light valves 925R, 925G and 925B serving as light modulators, which constitute the modulator 925, are respectively arranged opposite to the three sides of the prism unit 910, and fixed to the prism unit 910 through a fixing plate (not shown) to be mounted on the prism mounting surface of the head body 903. The liquid crystal light valve 925B is provided at a position opposite to the liquid crystal light valve 925R with the prism unit 910 held therebetween (FIG. 11). In FIG. 6, only a leader line (dotted line) and reference numeral are shown. Therefore, the liquid crystal light valves 925R, 925G and 925B are positioned on the lower side of the head body 903 and cooled with the cooling air supplied from the third intake fan 17C provided corresponding to an air inlet 240. In this case, the electric power of the third intake fan 17C is supplied from the power circuit substrate 13 through the driver board 11. The base end side of the projection lens 6 is fixed to the front side of the head body 903 by fixing screws. In this way, the head body 903 on which the prism unit 910, the modulator 925, and the projection lens 6 are mounted is fixed to the lower light guide 902 by fixing screws, as shown in FIG. 5.

Figure 10:
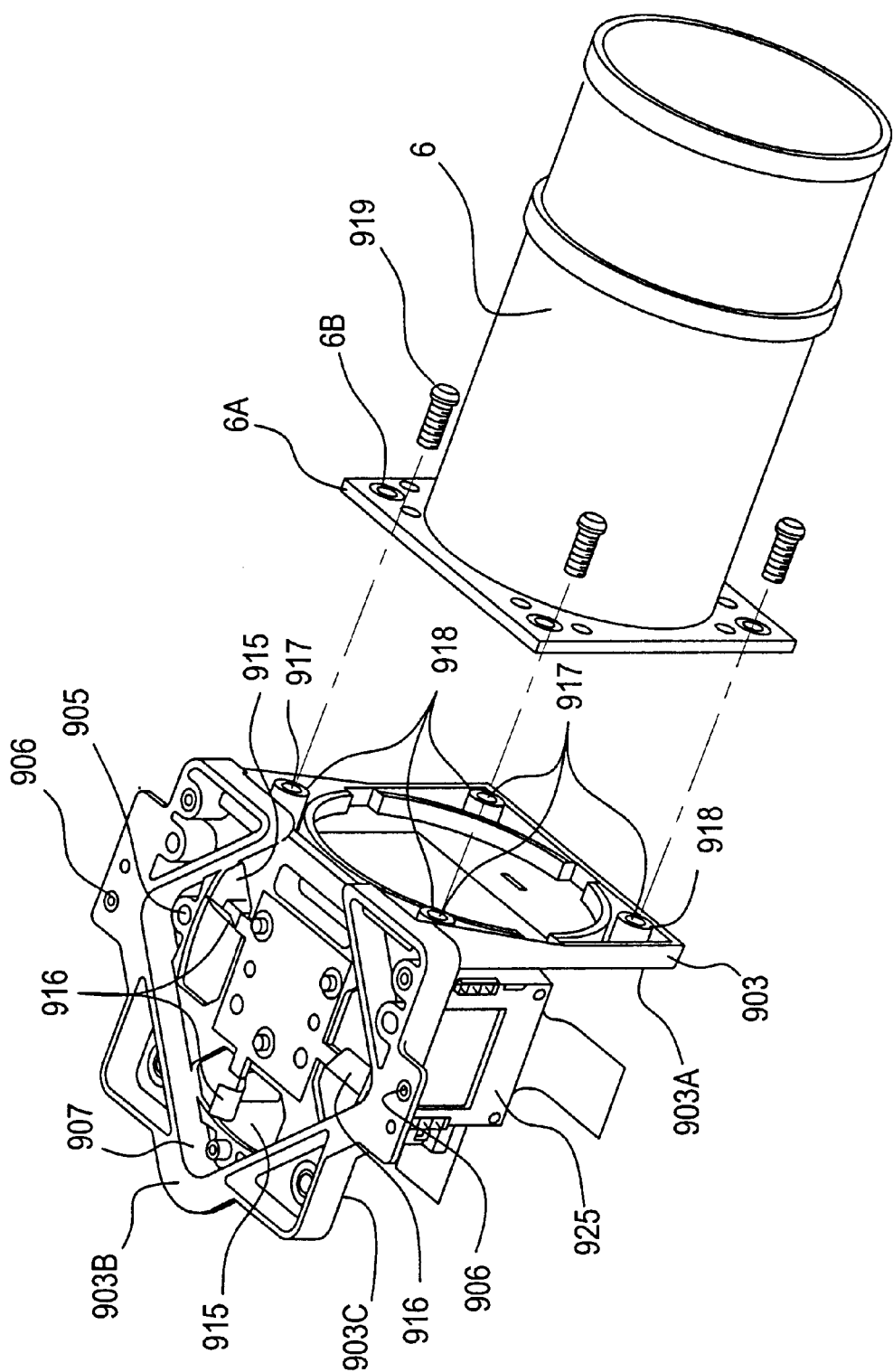
FIG. 10 is a perspective view showing the relationship between a vertical surface of a head body and mounting of a projection lens in the projection display device in accordance with an embodiment of the present invention.

As shown in FIGS. 6 and 10, four cylindrical projections 918 are formed on the vertical surface 903A of the head body 903. A tapped hole 917 is formed in each of the projections 918. On the other hand, mounting holes 6B are formed in a mounting flange 6A of the projection lens 6 so that the projection lens 6 can be mounted to the vertical surface of the head body 903 by bringing the mounting flange 6A into contact with the end surfaces of the projections 918, and then screwing machine screws 919 into the tapped holes 917 through the mounting holes 6B. At this time, the end surfaces of the projections 918 serve as reference surfaces for mounting the projection lens 6.

The driver board 11 is arranged above the optical unit 10, for driving and controlling the respective liquid crystal light valves 925R, 925G and 925B of the above-mentioned modulator 925. The lower driver board 11A and the upper driver board 11B are spaced with a stud bolt 9011, many elements not shown in the drawings, which form a driving circuit and the like, being mounted on the opposite surfaces of the lower and upper driver boards 11A and 11B. Namely, these elements are efficiently cooled with the cooling air which flows between the driver boards 11. The cooling air is mainly sucked by the third intake fan 17C to cool each of the liquid crystal light valves 925R, 925G and 925B, and then flows into the space between the respective driver boards 11 through the opening 904 (shown by a two-dot chain line in FIG. 3) of the upper light guide 901.

The main board 12 comprises a control circuit formed thereon for controlling the entirety of the projection display device 1, and is provided in a standing condition by the side of the optical unit 10. The main board 12 is electrically connected to the driver board 11 and the control switches 60, as well as an interface substrate 14 on which the input/output terminal group 51 is provided, and a video substrate 15. The main board 12 is also connected to the power circuit substrate 13 through a connector or the like. The control circuit of the main board 12 is driven by electric power generated by the power circuit on the power circuit board 13, namely, electric power supplied from the second power block 7B. The main board 12 is cooled with the cooling air which flows from the second intake fan 17B through the second power block 7B.

In FIG. 3, a metallic guard member 19 made of aluminum or the like is arranged between the main board 12 and the outer case 2 (FIG. 3 shows only the lower case 4 and the rear case 5). The guard member 19 has a large surface 191 extending between the upper and lower ends of the main board 12, and the upper side thereof is fixed to the cover member 250B of the second power block 7B by a fixing screw 192, the lower side being engaged to, for example, a slit, of the lower case 4. As a result, in mounting the upper case 3 to the lower case 4, interference between the upper case 3 (FIG. 1) and the main board 12 can be prevented, and the main board 12 can be protected from outer noise.

(4) Structure of the optical system

The structure of the optical system, namely, the optical unit 10, of the projection display device 1 will be described below on the basis of a schematic drawing of FIG. 11.

As described above, the optical unit 10 comprises the illumination optical system 923 for making uniform a planar illuminance distribution of a light flux (W) emitted from the light source lamp unit 8, the color separation optical system 924 for separating the light flux (W) from the illumination optical system 923 into red (R), green (G) and blue (B), the modulator 925 for modulating each of the light fluxes R, G and B according to image information, and the prism unit 910 serving as the color synthesis optical system for synthesizing the respective modulated light fluxes.

The illumination optical system 923 comprises a reflecting mirror 931 for bending the optical axis 1 a of the light flux W emitted from the light source lamp unit 8 in the forward direction of the device, and first and second lens plates 921 and 922 arranged with the reflecting mirror 931 held therebetween.

The first lens plate 921 has a plurality of rectangular lenses arranged in a matrix form to divide the light flux emitted from the light source into a plurality of light flux parts which are condensed near the second lens plate 922.

The second lens plate 922 has a plurality of rectangular lenses arranged in a matrix form and has the function to superpose each of the light flux parts emitted from the first lens plate 921 on the liquid crystal light valves 925R, 925G and 925B (described below) which constitute the modulator 925.

In this way, in the projection display device 1 of this embodiment, the liquid crystal light valves 925R, 925G and 925B can be illuminated with light with substantially uniform illuminance by the illumination optical system 923, thereby obtaining a projected image with uniformity in illuminance.

The color separation optical system 924 comprises a blue and green reflecting dichroic mirror 941, a green reflecting dichroic mirror 942, and a reflecting mirror 943. The blue green reflecting dichroic mirror 941 reflects at right angles a blue light flux B and green light flux G contained in the light flux W emitted from the illumination optical system 923 toward the green reflecting dichroic mirror 942.

The red light flux R passes through the blue green reflecting dichroic mirror 941, and is reflected at right angles by the reflecting mirror 943 and then emitted toward the prism unit 910 from the emission portion 944 of the red light flux R. Next, only the green light flux G of the blue and green light fluxes B and G reflected by the blue green reflecting dichroic mirror 941 is reflected at right angles by the green reflecting dichroic mirror 942, and then emitted from the emission portion 945 of the green light flux G toward the prism unit 910. The blue light flux B passing through the green reflecting dichroic mirror 942 is emitted from the emission portion 946 of the blue light flux B toward a light guide system 927. In this embodiment, the distances from the emission portion of the light flux W of the illumination optical system 923 to the emission portions 944, 945 and 946 of light fluxes R, G and B, respectively, in the color separation optical system 924 are set to be the same.

Condensing lenses 951 and 952 are arranged on the emission sides of the emission portions 944 and 945 of the red and green light fluxes R and G, respectively, in the color separation optical system 924. Therefore, the red and green light fluxes R and G emitted from the emission portions are incident on the condensing lenses 951 and 952, respectively, to be collimated.

The collimated red and green light fluxes R and G pass through incident side polarizers 960R and 960G, and are then incident on the liquid crystal light valves 925R and 925G, respectively, and modulated to add image information corresponding to each of the color lights. Namely, switching of the liquid crystal light valves 925R and 925G is controlled by the driver board 11 according to image information to modulate each of the color lights passing therethrough. On the other hand, the blue light flux B is guided to the corresponding liquid crystal light valve 925B through the light guide system 927, and modulated according to image information. As each of the liquid crystal light valves 925R, 925G and 925B of this embodiment, for example, a valve using polysilicon TFTs as switching elements can be used.

The light guide system 927 comprises a condensing lens 954 arranged on the emission side of the emission portion 946 of the blue light flux B, an incident side reflecting mirror 971, an emission side reflecting mirror 972, an intermediate lens 973 arranged between both reflecting mirrors, and a condensing lens 953 arranged in front of the liquid crystal light valve 925B so that the blue light flux B emitted from the condensing lens 953 passes through the incident side polarizer 960B and is incident on the liquid crystal light valve 925B and modulated therein. At this time, the optical axis 1a of the light flux W, and the optical axes Ir, Ig and Ib of the light fluxes R, G and B are formed in the same surface. With respect to the length of the optical path of each of the light fluxes, that is, the distance from the light source lamp 181 to each of the liquid crystal panels, the optical path of the blue light flux B is longest, and the light loss of the blue light flux B is maximum. However, the light loss can be suppressed by interposing the light guide system 927.

Next, the color light fluxes R, G and B passing through the liquid crystal light valves 925R, 925G and 925B and modulated thereby, respectively, pass through the emission side polarizers 961R, 961G and 961B and are then incident on the prism unit 910 and synthesized. Then, the color image synthesized by the prism unit 910 is enlarged and projected on a projection screen 100 at the predetermined position through the projection lens 6.

(5) Description of cooling passage

The cooling passage formed in the projection display device 1 will be described below.

In the projection display device 1, a first power block cooling passage 41, a second power block cooling passage 42, a modulation system cooling passage 43, and a light source cooling passage 44 are formed, as schematically shown by arrows in FIGS. 1 and 2. However, cooling air flowing through each of the cooling passages 41 to 44 does not strictly flow along the arrows shown in the drawings, but the cooling air passes through the spaces between the respective components and is sucked and exhausted substantially as shown by the arrows.

The first power block cooling passage 41 is a passage for the cooling air sucked from an intake port 171 by the first intake fan 17A (FIGS. 3 and 4). The first power block 7A is cooled with the cooling air, and then the lamp driving substrate 18 arranged behind the first power block 7A is cooled. At this time, the cooling air flows through the resin cover 185 having the front and rear open ends to restrict the flow in one direction, thereby securely maintaining a flow rate for cooling the lamp driving substrate 18. Then, the cooling air flows into the housing portion 9021 through an opening 9022 provided in the upper portion thereof, another opening not shown in the drawing, a space, or the like, to cool the light source lamp unit 8 (the light source lamp 181) arranged therein, and is then exhausted by the exhaust fans 16 through the exhaust port 160.

The second power block cooling passage 42 is a passage for cooling air sucked by the second intake fan 17B. The cooling air flows to cool the second power block 7B, and then cool the main board 12 arranged behind the second power block 7B, then flows into the housing portion 9021 through the opening 9023 or the like near the housing portion 9021 to cool the light source lamp unit 8, and is then exhausted by the exhaust fans 16 through the exhaust port 160.

The modulation system cooling passage 43 is a passage for cooling air sucked by the third intake fan 17C, shown in FIGS. 5 and 6. The cooling air flows to cool each of the liquid crystal light valves 925R, 925G and 925B as described above, and flows backward through the space between the upper and lower driver boards 11A and 11B through the opening 904 of the upper light guide 901 provided directly above the liquid crystal light valves along the opposite surfaces of the respective driver boards 11A and 11B. Namely, a portion of the modulator cooling passage 43 is formed by the respective driver boards 11A and 11B so as to efficiently cool the elements mounted on the opposite surfaces facing the modulator cooling passage 43. The cooling air flows into the housing portion 9021 through the above-described opening 9022 and 9023, as well as another opening 9024, to cool the light source lamp unit 8, and is then exhausted through the exhaust port 160.

The light source cooling passage 44 is a passage for cooling air sucked by the intake port 172 (FIG. 2) formed in the lower side of the lower case 4. The cooling air is sucked by the exhaust fans 16 through the intake port 172, flows into the housing portion 9021 through the opening or space provided in the lower surface of the housing portion 9021 to cool the light source lamp unit 8, and is then exhausted through the exhaust port 160.

The cooling air of each of the cooling passages 41 to 44 is exhausted by each of the exhaust fans 16 through the exhaust port 160, the exhaust fans 16 being controlled according to the temperature condition of the heated part. Namely, a temperature sensor 9025 covered with a shrink tube or the like is provided near the opening 9022 on the light source lamp unit 8 side which is easily heated, and the same sensor (not shown) is also provided near the phase plate 947 (FIG. 4) below the opening 9023 and near the first and second power blocks 7A and 7B, and the liquid crystal light valves 925R, 925G and 925B. Electric signals from the temperature sensors 9025 provided in each of the cooling passages 41 to 44 are output to the main board 12, for example, through the power circuit substrate 13 or the like. The main board 12 electrically processes the signals to detect the temperature of the heated part or the cooing air. As a result, control is made so that if it is decided that the temperature is high, both exhaust fans 16 are simultaneously driven to positively cool, while if it is decided that the temperature is low, only one of the exhaust fans 16 is driven, thereby saving power.

(6) Structure of the modulation system fan

Figure 7:
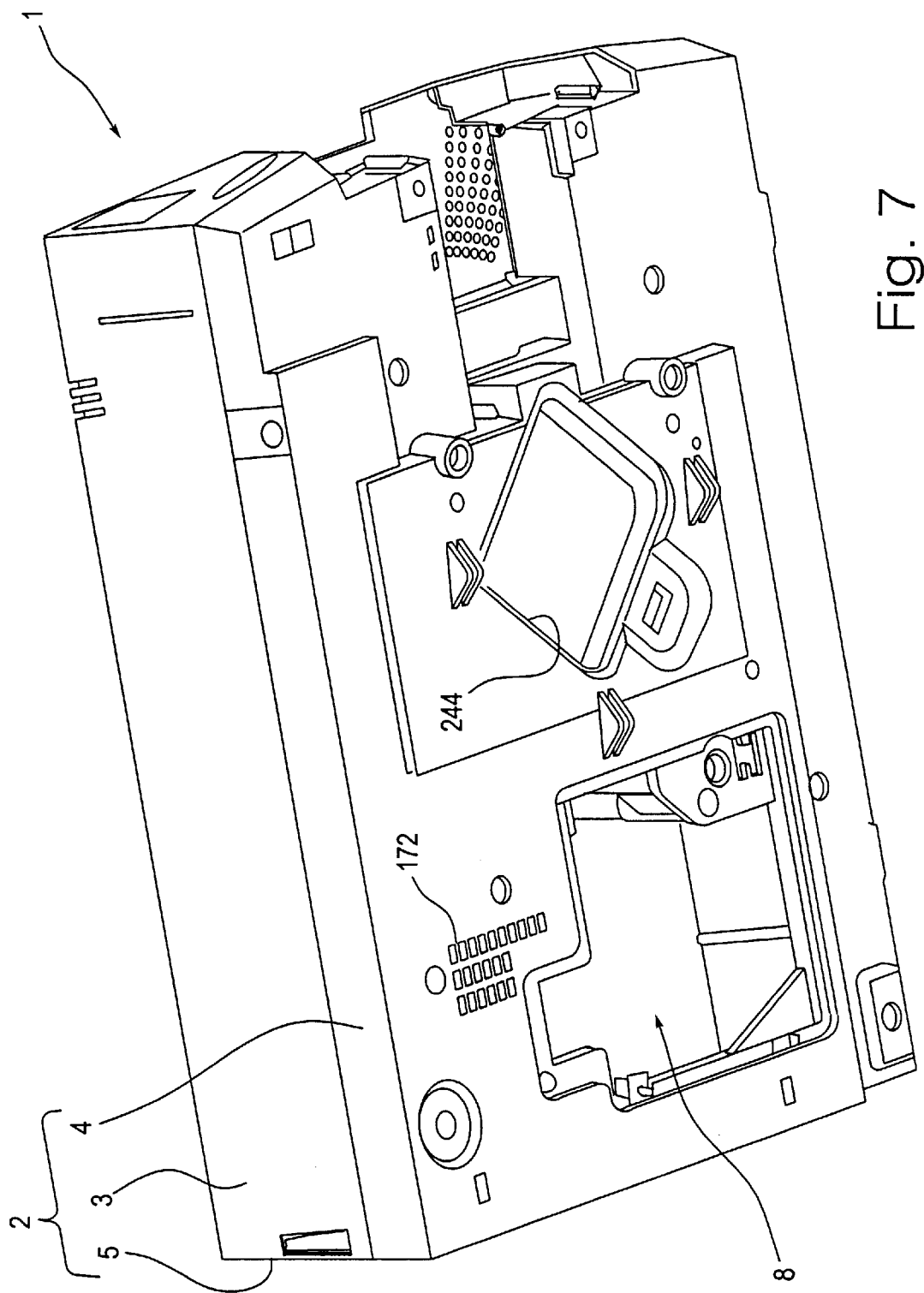
FIG. 7 is a perspective view of the projection display device in accordance with an embodiment of the present invention as viewed from a lower portion.
Figure 8:
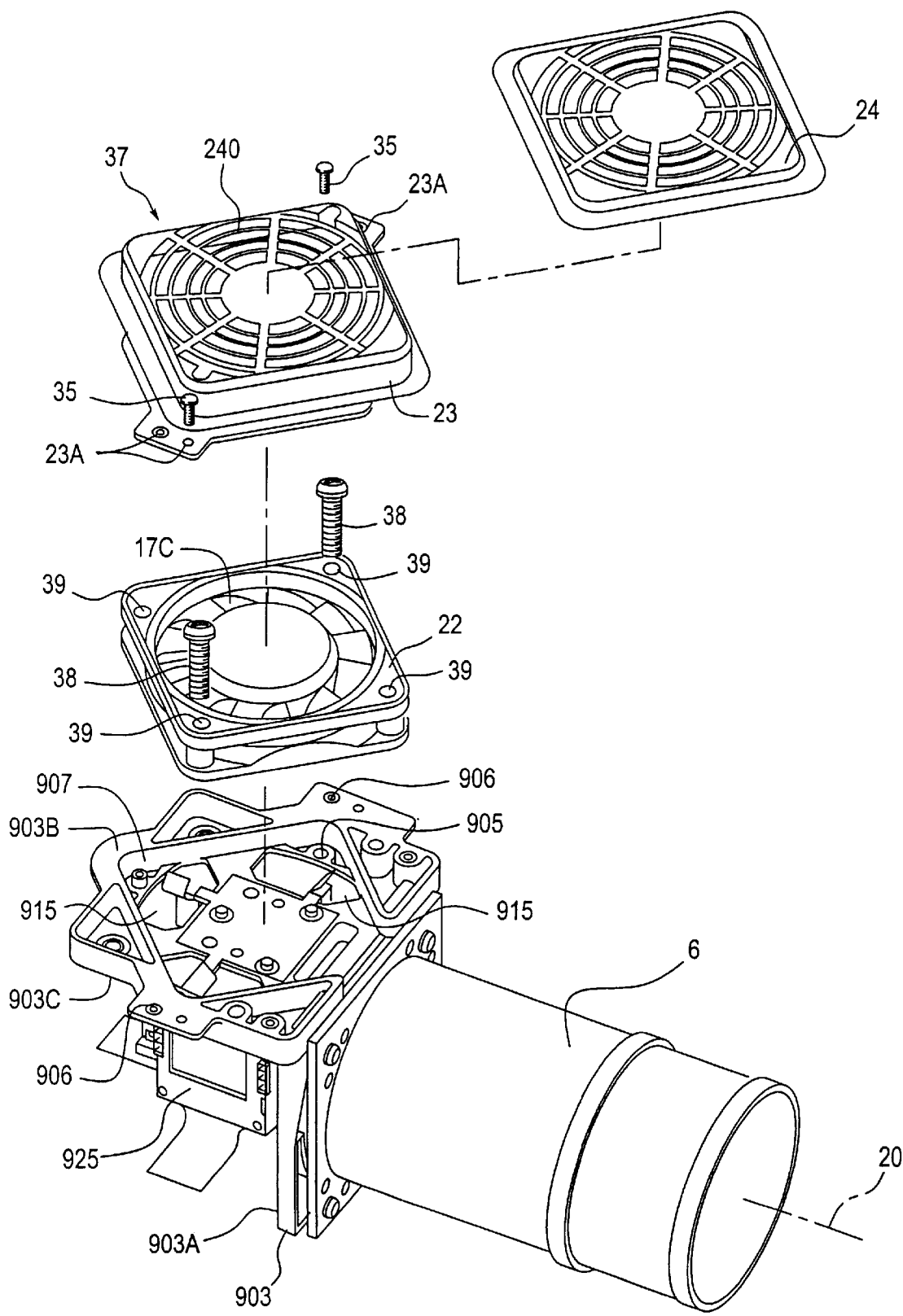
FIG. 8 is an exploded perspective view showing a fan for cooling an optical system of the projection display device in accordance with an embodiment of the present invention.

The air filter cover 23 in the air inlet 240 shown in FIG. 2, and the modulator fan section 37 containing the intake fan 17C have such a structure as shown in FIGS. 7 and 8. Namely, a rectangular fan opening 244 is formed in the rear side of the lower case 4, for containing a fan frame 22 to which the intake fan 17C of the modulator fan section 37 is mounted, and the air filter cover 23. In the fan opening 244, one diagonal line is directly below the center line of the projection lens 6.

Such a fan opening 244 is continued from a recessed portion 907 provided on the rear side 903B (refer to FIG. 8) of the head body 903 so that the fan frame 22 can be mounted in the recessed portion 907. The surface of the head body 903 opposite to the rear side 903B serves as the prism mounting surface 903C to which the prism unit 910 can be mounted, as shown in FIG. 6. The intake fan 17C is held by the fan frame 22. The fan frame 22 is mounted by inserting machine screws 38 into mounting holes 39 provided at positions symmetrical with the center line 20 of the projection lens 6 held therebetween, and screwing the machine screws 38 into the screw holes 905 provided in the head body 903. The mounting holes 39 are provided at the four corners of the fan frame 22. The mounting holes 39 formed at the four corners on the diagonal lines can be used, thereby improving efficiency of the mounting work.

The air filter cover 23 for covering the intake fan 17C is also mounted to the head body 903. In this case, two cover screw holes 906 are provided at positions symmetrical with the center line 20 outside the recessed portion 907 of the head body 903, and mounting holes 23A corresponding to the screw holes 906 are provided at two corners of the air filter cover 23. Cover mounting screws 35 are respectively inserted into the mounting holes 23A, and screwed into the screw holes 906 of the head body 903 to mount the air filter cover 23 to the head body 903. Also, a filter 24 is detachably mounted to the lower case 4 so as to cover the outer surface of the air filter cover 23 and the fan opening 244 of the lower case 4. The air inlet formed in the surface of the filter 24 is formed in substantially the same shape as the shape of the air inlet 240 of the air filter cover 23, and thin sponge or the like which can ventilate is attached to the rear side of the filter 24 over the entire air inlet 240.

Figure 9:
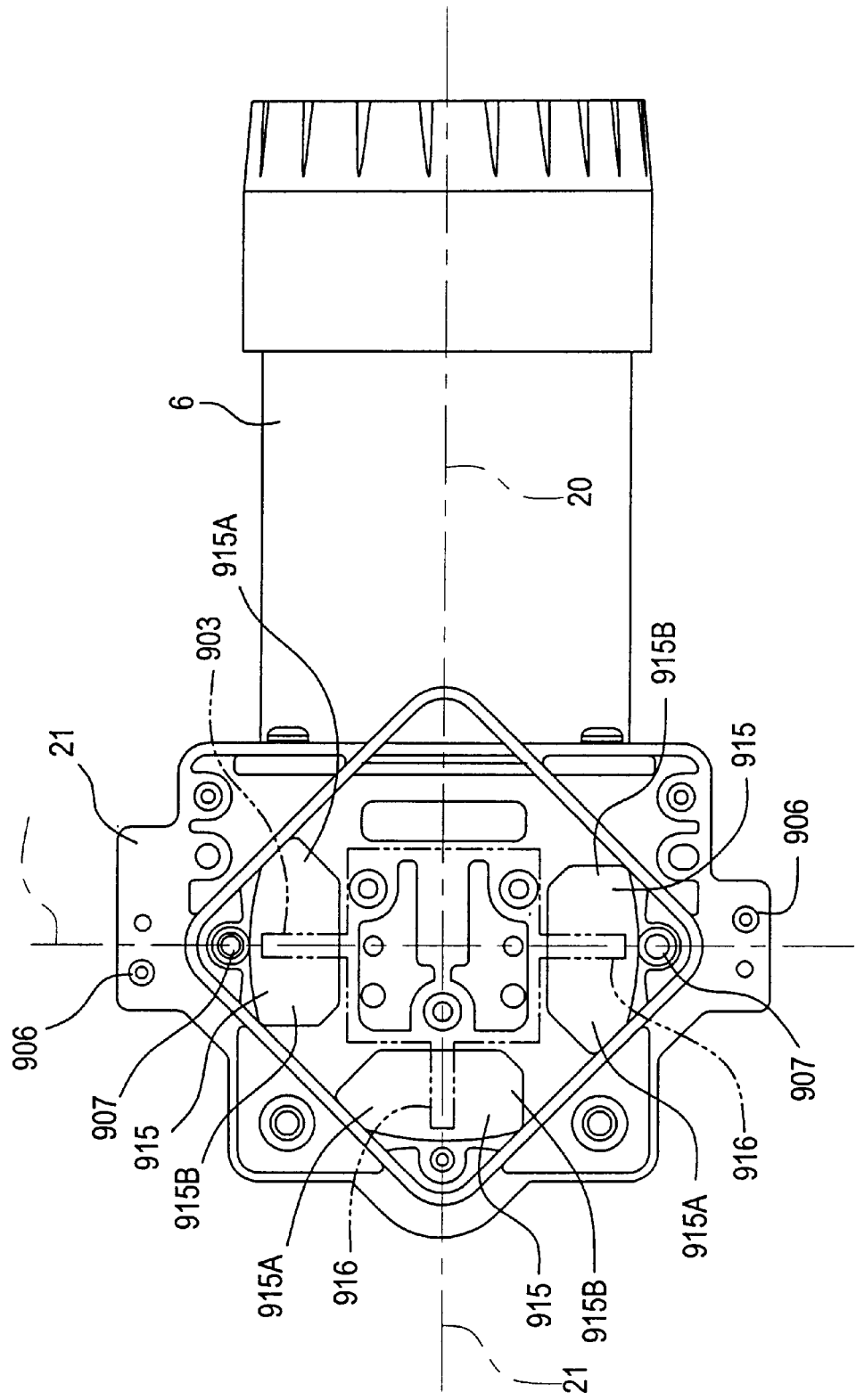
FIG. 9 is a plan view of a head body of the projection display device in accordance with an embodiment of the present invention as viewed from a rear side.

As shown in FIG. 9, three air inlets 915 are provided in the prism mounting surface 903C of the head body 903, for sending the cooling air sucked by the intake fan 17C upward, that is, toward the liquid crystal light valves 925R, 925G and 925B, respectively. The air inlets 915 respectively correspond to the liquid crystal light valves 925R, 925G and 925B. Each of the air inlets 915 is formed so that the region (enlarged portion 915A) opposite to the spiral direction of cooling air (FIG. 6) blown from the intake fan 17C with respect to each of the lines 21 of intersection of the air inlets 915 and surfaces, which cross at right angles the liquid crystal light valves 925R, 925G and 925B and the prism mounting surface 903C, and which include the centers of the liquid crystal light valves 925R, 925G and 925B, is wider than the region (unenlarged portion 915B) on the other side. Therefore, since the cooling air A is introduced through the enlarged portions 915A, each of the liquid crystal light valves 925R, 925G and 925B is uniformly cooled even if the air is spirally blown.

Also, a straightening vane 916 is provided in each of the air inlets 915 at the position of each of the lines 21 of intersection, as shown in FIGS. 8 and 9. The straightening vanes 916 are partially contained in the recessed portion 907, and the dimensions of the rising portions of the straightening vanes 916 contained in the recessed portion 907 are substantially the same as the depth of the recessed portion 907.

(7) Effect of this embodiment

The embodiment has the following effects:

1) Since each of the air inlets 915 formed in the head body 903 has the enlarged portion 915A, cooling air is also introduced through the enlarged portion 915A. Therefore, even if the cooling air is spirally blown to the liquid crystal light valves 925R, 925G and 925B from the intake fan 17C, the respective liquid crystal light valves 925R, 925G and 925B are uniformly cooled with a good balance.

2) Since the enlarged portion 915A is formed on only one side of each of the air inlets 915 of the head body 903, the space between the adjacent air inlets 915 is not decreased. Therefore, material for the head body 903 is easily rotated during molding, for example, thixomolding or the like, thereby facilitating molding of the head body 903.

3) Since the straightening vane 916 is provided in each of the air inlets 915 of the head body 903 in the direction along the center line 20 and the line 21 of intersection, the cooling air introduced through the intake fan 17C is efficiently guided by the straightening vane 916, thereby efficiently cooling the respective liquid crystal light valves 925R, 925G and 925B with a good balance.

4) The four cylindrical projections 918 are formed on the vertical surface of the head body 903 so that the projection lens 6 can be mounted on the basis of the end surfaces of the projections 918. Therefore, in order to precisely position the projection lens 6, the end surfaces of the projections 918 may be shaved without shaving the entire vertical surface, thereby decreasing the required labor.

5) Since the air filter cover 23 is provided to cover the intake fan 17C, the cover 23 protects the operator from an accident in which the hand is mistakenly inserted into the fan section 37, and thus exhibits safety.

6) Since the air filter cover 23 and the air inlet 240 on the surface of the filter 24 are formed in a spider web-like shape, and a sponge or the like is attached to the rear side of the filter 24, air can be sufficiently taken in while removing dust particles and the like, thereby improving the cooling effect.

The present invention is not limited to the above-described embodiment, and includes other constructions which permit achievement of the object of the invention and the following modifications:

Although, in the embodiment, the modulator comprises the three liquid crystal light valves 925R, 925G and 925B, the modulator is not limited to this, and may comprise one, two, three or more light valves.

Although, in the embodiment, the mounting surface 903C on which the liquid crystal light valves 925R, 925G and 925B, and the prism unit 910 are mounted is provided on the head body 903, the present invention is not limited to this, and for example, the mounting surface may be formed in a portion of the lower light guide 902.

As described above, the present invention has the advantage that since each of the air inlets is enlarged on a side opposite to the spiral, cooling air is blown through the enlarged portion, thereby cooling the light modulator with a good balance.

What is claimed is:

1. A projection display device comprising:
a light source;
a light modulator for modulating light from the light source, the light modulator being mounted on a mounting surface;
a projection optical system for projecting the light modulated by the light modulator;
a fan that supplies cooling air to the light modulator, the fan disposed on a side of the mounting surface opposite to a side where the light modulator is mounted, the cooling air being supplied by the fan in a spiral direction; and
an air inlet that introduces cooling air to the light modulator at a position adjacent the mounting surface where the light modulator is mounted, the air inlet being comprised of first and second regions, the first region being formed opposite to the spiral direction of the cooling air supplied to the light modulator through the fan, the first region and the second region being on opposite sides of a line of intersection of the air inlet and a surface which includes a center of the light modulator and which crosses the light modulator and the mounting surface at right angles, the first region being wider than the second region.

2. A projection display device according to claim 1, further comprising a straightening vane provided in the air inlet, the straightening vane arranging a flow of the cooling air.

3. A projection display device according to claim 2, the straightening vane being provided at the line of intersection in each of the air inlets.

4. A projection display device according to claim 3, further comprising a recessed portion provided in the mounting surface, for arranging the fan, the straightening vane having substantially a same depth as the recessed portion.

5. A projection display device according to claim 1, further comprising a head body having a vertical surface substantially perpendicular to the mounting surface, a plurality of cylindrical projections provided on the vertical surface, and a projection lens, which constitutes the projection optical system, the projection lens being attached to end surfaces of the projections.

6. A projection display device comprising:
a plurality of light modulators for modulating light of a plurality of colors;
a color synthesis optical system for synthesizing light modulated by the light modulators, the light modulators and the color synthesis optical system being mounted on a mounting surface;
a projection optical system for projecting the light synthesized by the color synthesis optical system;
a fan that supplies cooling air to the light modulators, the fan being disposed on a side of the mounting surface opposite to a side where the light modulators and the color synthesis optical system are mounted, the cooling air being supplied by the fan in a spiral direction; and
air inlets that introduce cooling air to each of the light modulators at a position adjacent the mounting surface where each of the light modulators is mounted, the air inlets each being comprised of first and second regions, the first region being formed opposite to the spiral direction of the cooling air supplied to the light modulators through the fan, the first and second regions being on opposite sides of each of lines of intersection of the air inlets and surfaces which include centers of the light modulators and which cross the light modulators and the mounting surface at right angles, the first region being wider than the second region.

7. A projection display device according to claim 6, the color synthesis optical system comprising a prism having a color synthesis film, and the plurality of light modulators are arranged opposite to light incident surfaces of the prism.

8. A projection display device according to claim 6, further comprising a straightening vane provided in each of the air inlets, the straightening vane arranging a flow of the cooling air.

9. A projection display device according to claim 8, the straightening vane being provided at the line of intersection in each of the air inlets.

10. A projection display device according to claim 9, further comprising a recessed portion provided in the mounting surface, for arranging the fan, the straightening vane having substantially a same depth as the recessed portion.

11. A projection display device according to claim 6, further comprising a head body having a vertical surface substantially perpendicular to the mounting surface, a plurality of cylindrical projections provided on the vertical surface, and a projection lens, which constitutes the projection optical system, the projection lens being attached to end surfaces of the projections.

\* \* \* \* \*

UNITED STATES PATENT AND TRADEMARK OFFICE
CERTIFICATE OF CORRECTION

PATENT NO. : 6,203,159 B1
DATED : March 20, 2001
INVENTOR(S) : Takeshi Takizawa

It is certified that error appears in the above-identified patent and that said Letters Patent is hereby corrected as shown below:

Claims 1, 2, 3, 4, 5, 6, 7, 8, 9, 10 and 11,
Line 1, change "projection display device" to -- projector --.

Signed and Sealed this

First Day of January, 2002

Attest:

JAMES E. ROGAN
*Attesting Officer*  *Director of the United States Patent and Trademark Office*